US012780328B2

(12) United States Patent
Park et al.

(10) Patent No.: US 12,780,328 B2
(45) Date of Patent: Nov. 3, 2026

(54) FASTENING DEVICE FOR MOBILITY AND MOBILITY HAVING THE SAME

(71) Applicants: HYUNDAI MOTOR COMPANY, Seoul (KR); KIA CORPORATION, Seoul (KR)

(72) Inventors: Danghee Park, Seoul (KR); Sukmin Choi, Hwaseong-si (KR); Sunwook Kim, Asan-si (KR); Hongmin Kim, Chungcheongnam-do (KR); Sangwoo Hwang, Seoul (KR); Sehyun Chang, Suwon-si (KR); Injae Hwang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 623 days.

(21) Appl. No.: 18/218,309

(22) Filed: Jul. 5, 2023

(65) Prior Publication Data

US 2024/0124074 A1 Apr. 18, 2024

(30) Foreign Application Priority Data

Oct. 18, 2022 (KR) ........................ 10-2022-0134180

(51) Int. Cl.
*B62D 27/06* (2006.01)
*B62D 63/02* (2006.01)
(Continued)

(52) U.S. Cl.
CPC ......... *B62D 27/065* (2013.01); *B62D 63/025* (2013.01); *F16B 5/0266* (2013.01); *F16B 37/0857* (2013.01)

(58) Field of Classification Search
CPC .. B62D 27/065; F16B 5/0266; F16B 37/0807; F16B 37/0857; F16B 2200/73
See application file for complete search history.

(56) References Cited

U.S. PATENT DOCUMENTS 971,375 A * 9/1910 Hays ........................ B25B 27/26 29/257
6,007,284 A * 12/1999 Taneichi ............. F16B 37/0857 411/270

(Continued)

FOREIGN PATENT DOCUMENTS

CN 110709267 A 1/2020
EP 3901012 A1 10/2021

(Continued)

*Primary Examiner* — Michael P Ferguson
(74) *Attorney, Agent, or Firm* — Morgan, Lewis & Bockius LLP

(57) ABSTRACT

A fastening device for mobility and a mobility including the same includes a first fastening unit provided in a first module of the mobility, and a second fastening unit disposed in a second module of the mobility, the second fastening unit coupled or decoupled to the first fastening unit for attachment or detachment between the first module and the second module, wherein the first fastening unit and the second fastening unit include a first fastening member and a second fastening member selectively screw-coupled together, respectively, the second fastening unit further includes a support member configured to support rotatably the second fastening member.

16 Claims, 15 Drawing Sheets

(51) Int. Cl.
*F16B 5/02* (2006.01)
*F16B 37/08* (2006.01)

(56) References Cited

U.S. PATENT DOCUMENTS

| | | | | |
|---|---|---|---|---|
| 6,106,035 | A * | 8/2000 | Hetherington | E05C 5/04 411/433 |
| 6,276,477 | B1 | 8/2001 | Ida et al. | |
| 10,668,926 | B2 | 6/2020 | Birnschein et al. | |
| 11,143,223 | B2 * | 10/2021 | Delaney | F16B 37/0857 |
| 12,485,973 | B2 * | 12/2025 | Woo | B62D 25/2009 |
| 2013/0256482 | A1 * | 10/2013 | Liao | G10D 13/28 248/219.4 |
| 2021/0088071 | A1 * | 3/2021 | Taneichi | F16B 37/0864 |

FOREIGN PATENT DOCUMENTS

| | | | |
|---|---|---|---|
| JP | 2598679 | B2 | 4/1997 |
| KR | 10-2022-0022925 | A | 3/2022 |
| WO | 2018-230720 | A1 | 12/2018 |

* cited by examiner

FASTENING DEVICE FOR MOBILITY AND MOBILITY HAVING THE SAME

CROSS-REFERENCE TO RELATED APPLICATION(S)

The present application claims priority to Korean Patent Application No. 10-2022-0134180, filed on Oct. 18, 2022, the entire contents of which is incorporated herein for all purposes by this reference.

BACKGROUND OF THE PRESENT DISCLOSURE

Field of the Present Disclosure

The present disclosure relates to a fastening device for mobility and a mobility having the same, and more particularly to a fastening device for mobility and a mobility having the same for coupling and decoupling between modules provided in the mobility.

DESCRIPTION OF RELATED ART

Recently, the advent of an autonomous driving vehicles increases importance of internal space in vehicle and accelerates development of drive modules based on electrified vehicles, leading to a growing interest in purpose-built vehicles (PBVs).

One of the features of PBVs is a fact that a drive module dedicated to driving may be shared. In other words, the PBVs allows various types of body modules providing internal space to mount selectively on drive modules with the same specifications, so that overall development cost and production cost of the vehicle may be reduced.

Accordingly, to increase the commonality of drive modules of the PBVs, it is expected that simplification and standardization of a fastening structure for attaching and detaching drive modules and body modules is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fastening device for mobility configured for simplifying structure and workability according to attachment or detachment between modules forming mobility and a mobility having the same.

Another aspect of the present disclosure provides a fastening device for mobility configured for simplifying structure and workability according to attachment or detachment of a drive module and a body module of a mobility, and the mobility having the same.

Additional aspects of the present disclosure are set forth in part in the description which follows, and in part, should be understood from the description, or may be learned by practice of the present disclosure.

In accordance with an aspect of the present disclosure, a fastening device for a mobility includes a first fastening unit provided in a first module of the mobility, and a second fastening unit disposed in a second module of the mobility, the second fastening unit coupled or decoupled to the first fastening unit for attachment or detachment between the first module and the second module, wherein the first fastening unit and the second fastening unit include a first fastening member and a second fastening member selectively screw-coupled together, respectively, the second fastening unit further includes a support member configured to support rotatably the second fastening member.

The support member may rotatably support, by a force holding the first module and the second module together or apart, a circumference of the second fastening member so that the second fastening unit rotates in a direction in which the second fastening member is fastened to the first fastening member or the second fastening unit rotates in a direction in which the second fastening member is released from the first fastening member.

The support member may be movably provided in a direction opposite to a fastening direction of the first fastening member and the second fastening member, and the second fastening unit may further include an elastic member for elastically supporting the support member in a process of fastening the second fastening member to the first fastening member.

The elastic member may be compressed and then restored in a process of fastening the second fastening member to the first fastening member.

The elastic member may be compressed and then restored while the second fastening member is fastened to the first fastening member, and is tensioned and then restored while the second fastening member is released from the first fastening member.

The second fastening unit may further include an elastic member and a housing including an accommodation space open toward the first fastening unit, the support member may be slidably accommodated in the accommodation space in a direction opposite to a fastening direction of the first fastening member and the second fastening member, and the elastic member may further include a coil spring accommodated in the accommodation space to be compressed by the support member sliding in the fastening direction.

The second fastening unit may further include a fixing member fixed on the accommodation space and to which a first end portion of the coil spring is coupled.

The other end portion of the coil spring may be coupled to a bearing.

The fastening device may further include a locking unit configured to lock or unlock a fastened state of the first fastening member and the second fastening member.

The fastening device may further include a housing accommodating the support member and including an accommodation space open toward the first fastening unit, a first locking hole is formed in the housing, a second locking hole communicating with the first locking hole is formed in the first fastening member in a state in which the second fastening member is fastened to the first fastening member, and the locking unit includes a locking member coupled to or separated from the first locking hole and the second locking hole communicating with each other.

The locking unit may operate the locking member which is coupled to or separated from the first locking hole and the second locking hole by use of electric power.

The locking unit may automatically lock the fastened state at a time when fastening of the first fastening member and the second fastening member is completed.

The second fastening unit may further include a housing accommodating the support member and including an accommodation space open toward the first fastening unit, a first locking hole is formed in the housing, a second locking hole communicating with the first locking hole is formed in the first fastening member in a state in which the second fastening member is fastened to the first fastening member, and the locking unit includes a locking member slidably fastened to the first locking hole and including a front end portion provided to be caught in the second locking hole, an elastic member configured to elastically press the locking member toward the first locking hole, and an adjustor positioned outside the housing and configured to operate the locking member so that pressing force of the elastic member is selectively applied to the locking member.

The first fastening member may include a protruding member including a protruding portion, and the second fastening member may include an annular member including a fastened hole into which the protruding portion is screw-coupled.

The protruding member may include a bolt, and the annular member may include a nut.

The support member may further include a bearing for rotatably supporting the nut.

The first module may include a lower drive module responsible for driving the mobility, and the second module may include an upper body module providing an internal space for the mobility.

In accordance with another aspect of the present disclosure, a mobility includes a first module and a second module, and a fastening device configured to attach or detach the first module and the second module, wherein the fastening device includes a first fastening unit provided in the first module, and a second fastening unit provided in the second module and coupled or decoupled to the first fastening unit for the attachment or the detachment of the first module and the second module, the first fastening unit and the second fastening unit include a first fastening member and a second fastening member selectively screw-coupled together, respectively, the second fastening unit further includes a support member configured to support rotatably the second fastening member, the support member is configured to guide a rotation of the second fastening member so that a force holding the first module and the second module together or apart allows the second fastening member to rotate in a direction to be fastened to the first fastening member or allows the second fastening member fastened to the first fastening member to rotate in a direction to be released from the first fastening member.

The force holding together may include a force that presses at least one of the first module and the second module, which are in a separated state, in a direction in which the first module and the second module are adjacent to each other, and the force holding apart may include a force that separates at least one of the first module and the second module, which are in a coupled state, in a direction in which the first module and the second module are moved away from each other.

The first module and the second module may be provided in a vertical direction, the force holding together may include a load of an upper one of the first module and the second module, and the force holding apart may include a load of a lower one of the first module and the second module.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
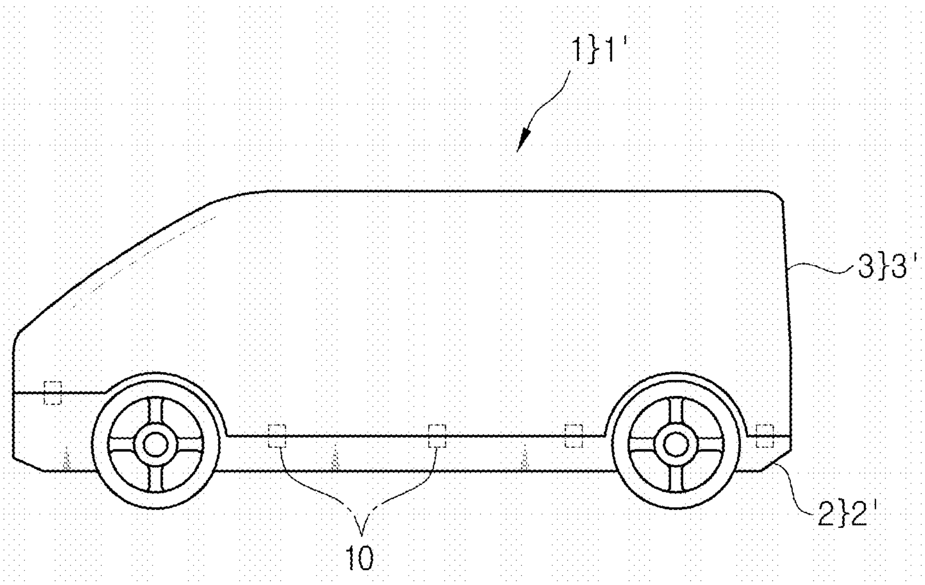
FIG. 1 is a perspective view of a mobility according to an exemplary embodiment of the present disclosure, showing a state in which a drive module and a body module are coupled.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference is made below in detail to the exemplary embodiments of the present disclosure, examples of which are illustrated in the accompanying drawings, wherein like reference numerals refer to like elements throughout. This specification does not describe all elements of the disclosed exemplary embodiments and detailed descriptions of what is well known in the art or redundant descriptions on substantially the same configurations have been omitted. The terms 'part', 'module', 'member', 'block' and the like as used in the specification may be implemented in software or hardware. Furthermore, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements included in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it includes a clearly different meaning in the context.

The reference numerals used in operations are used for descriptive convenience and are not intended to describe the order of operations and the operations may be performed in a different order unless otherwise stated.

When a component, device, element, or the like of the present disclosure is described as having a purpose or performing an operation, function, or the like, the component, device, or element should be considered herein as being "configured to" meet that purpose or to perform that operation or function.

Hereinafter, various embodiments of the present disclosure are described in detail with reference to the accompanying drawings.

Figure 2:
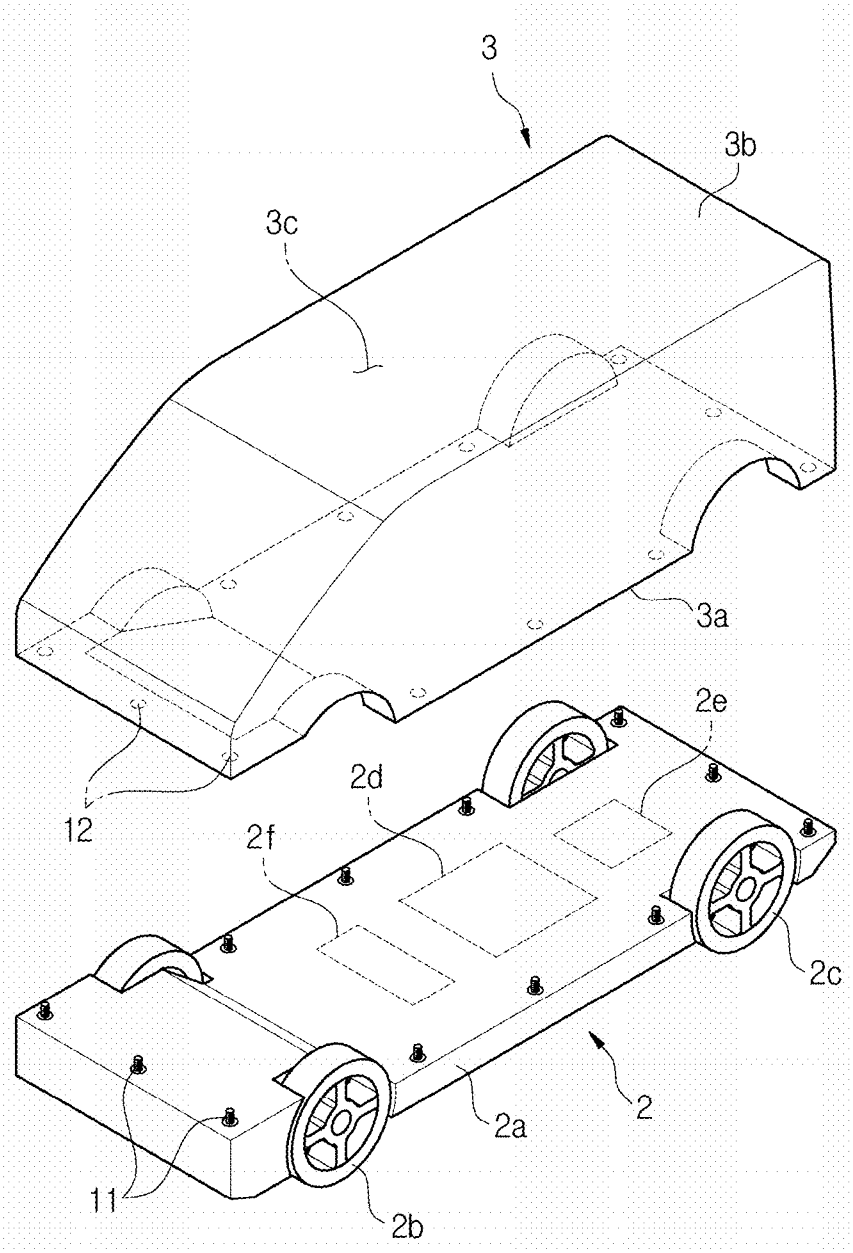
FIG. 2 is a perspective view of a mobility according to an exemplary embodiment of the present disclosure, showing a state in which a drive module and a body module are decoupled.

As shown in FIG. 1 and FIG. 2, a fastening device 10 for mobility according to an exemplary embodiment of the present disclosure is a device for attaching and detaching between a first module 2' and a second module 3' included in a mobility 1'.

Herein, the mobility 1' may include a vehicle 1, and may also include a means of transportation through which a user may move, such as an autonomous vehicle, a kickboard, a bicycle, an electric bicycle, a bike, and an electric scooter.

Hereinafter, a case in which the mobility 1' is provided as the vehicle 1 will be mainly described.

The first module 2' of the mobility 1' may include a drive module 2 responsible for driving the vehicle 1, and the second module 3' of the mobility 1' may include a body module 3 providing an internal space 3*c* of the vehicle 1. The drive module 2 may be positioned at a lower side of the vehicle and the body module 3 may be positioned at an upper side of the vehicle. Furthermore, the fastening device 10 for mobility may attach or detach (or couple and decouple) between the drive module 2 and the body module 3.

The arrangement direction of the first module 2' and the second module 3' detachable through the fastening device 10 is not limited to a vertical direction thereof. The first module 2' and the second module 3' may be disposed in the vertical direction as well as in a lateral or diagonal direction, and the fastening device 10 may be used to make the first module 2' and the second module 3' detachable regardless of the arrangement direction thereof.

Furthermore, the vehicle 1 may include purpose-built vehicles (PBVs) in which the drive module 2 is shared so that any one of various types of body modules 3 may be selectively mounted on the drive module 2 and used.

Hereinafter, the vehicle 1 will be described based on being provided as the PBV.

The drive module 2 may include overall configurations related to driving of the vehicle, such as, a frame 2*a*, front wheels 2*b* and rear wheels 2*c* provided in the front and rear of the frame 2*a*, a battery 2*d*, a motor 2*e* driven by the battery 2*d* to rotate at least one of the front wheels 2*b* and the rear wheels 2*c*, a generator 2*f* for charging the battery 2*d*. The motor 2*e* may be replaced by an engine or employed together with the engine.

The body module 3 may include a body 3*b* and a floor portion 3*a*. The internal space 3*c* formed by the floor portion 3*a* and the body 3*b* forms a vehicle body compartment, and the vehicle body compartment may be provided with internal items, such as a steering wheel and seats, not shown.

The fastening device 10 may include a first fastening unit 11 disposed on the drive module 2 and a second fastening unit 12 disposed on the body module 3 to be coupled or decoupled to the first fastening unit 11.

A plurality of fastening devices 10 may be provided in a boundary area between the drive module 2 and the vehicle body module 3.

The plurality of first fastening units 11 is disposed along the edge portion of the frame 2*a*, and the plurality of second fastening units 12 is disposed along the edge portion of the floor portion 3*a* to correspond to the positions of the first fastening units 11.

Figure 3:
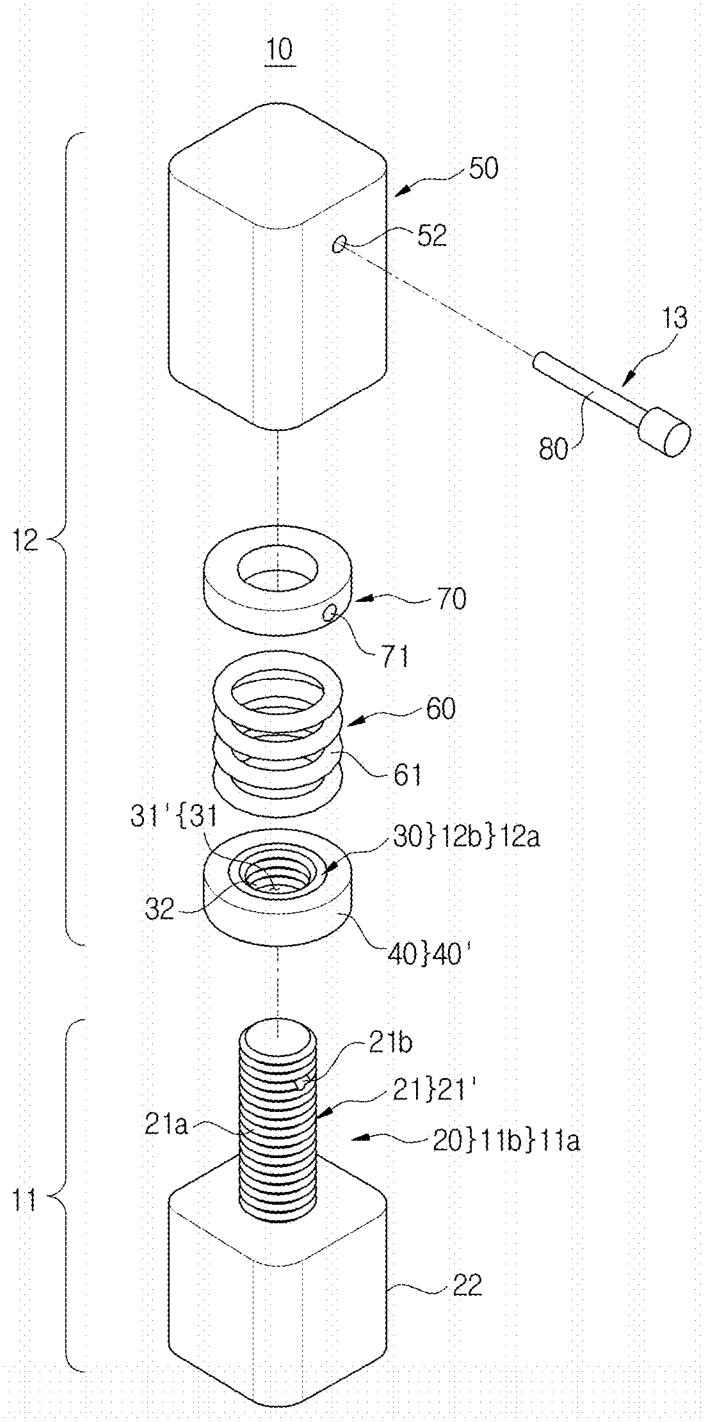
FIG. 3 is an exploded perspective view of a fastening device for mobility according to an exemplary embodiment of the present disclosure.
Figure 4A:
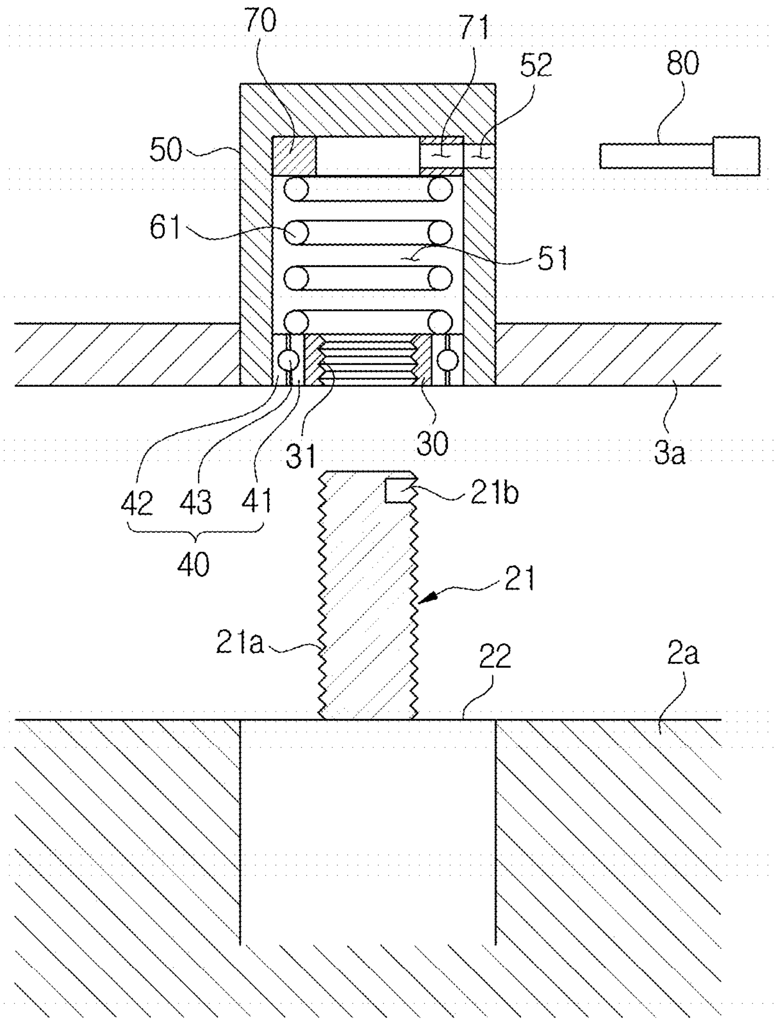
FIG. 4A, FIG. 4B, FIG. 4C and FIG. 4D are cross-sectional views sequentially illustrating a process in which a first fastening unit and a second fastening unit of a fastening device for mobility according to an exemplary embodiment of the present disclosure are fastened together in a state in which the first and second fastening units are provided in a drive module and a body module, respectively.
Figure 4B:
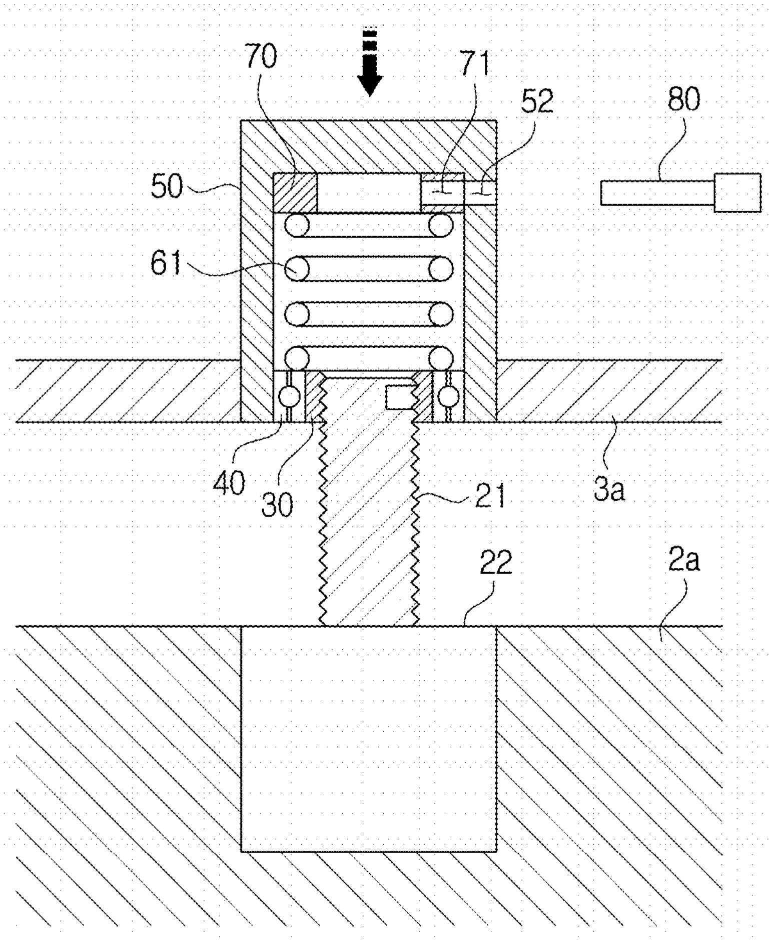
Figure 4C:
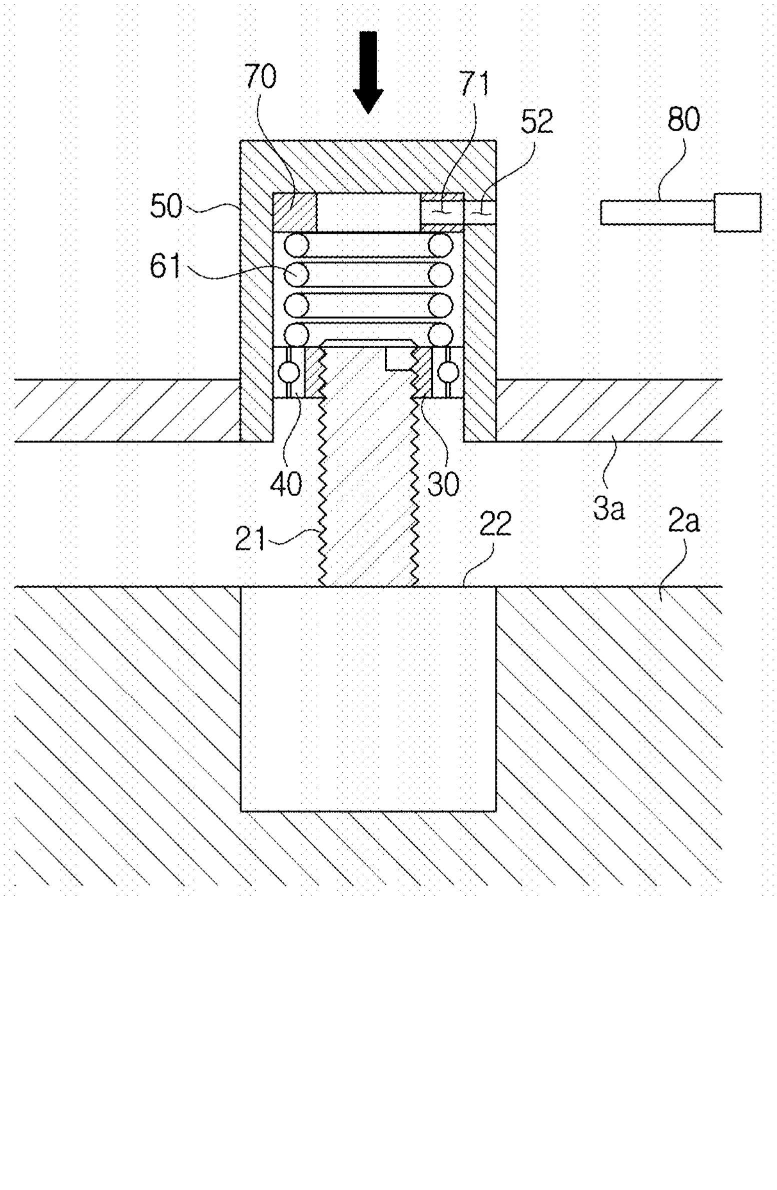
Figure 4D:
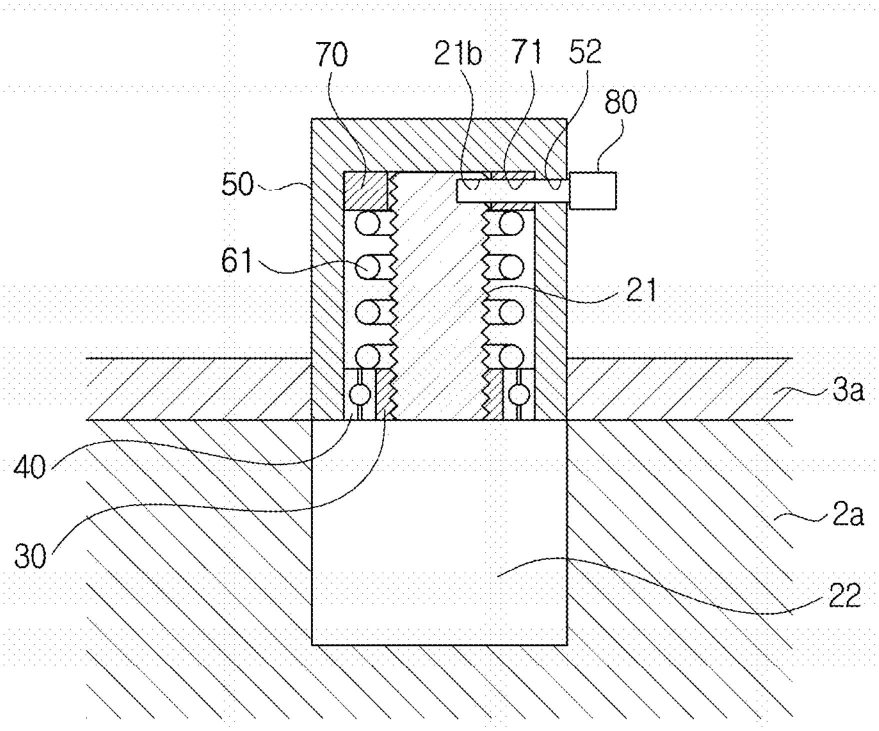
Figure 5:
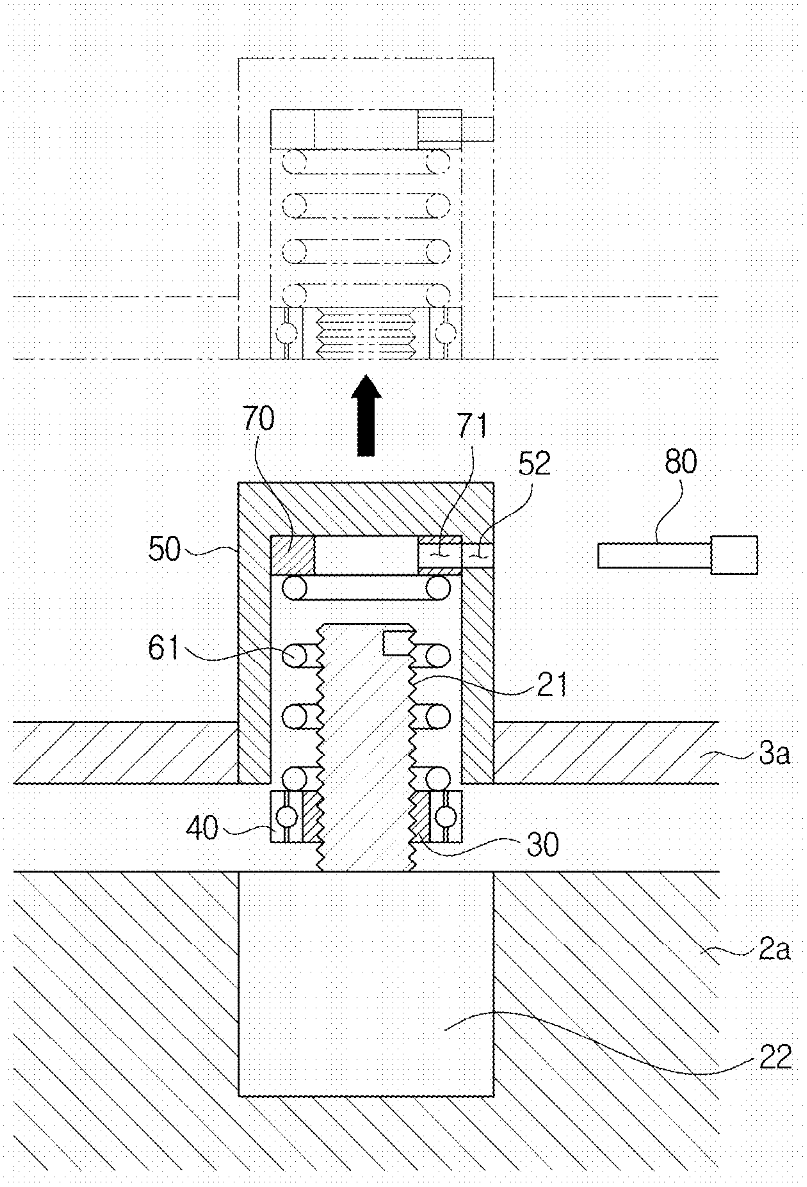
FIG. 5 is a view exemplarily illustrating a process in which a first fastening unit and a second fastening unit of a fastening device for mobility according to an exemplary embodiment of the present disclosure are separated from each other.

As shown in FIG. 3 to FIG. 5, the first fastening unit 11 and the second fastening unit 12 each include a first fastening member 11*a* and a second fastening member 12*a* that are screw-coupled to each other.

The first fastening member 11*a* may include a protruding member 11*b* including a protruding portion 21', and the second fastening member 12*a* may include an annular member 12*b* including a fastened hole 31' into which the protruding portion 21 is screw-coupled.

Herein, the protruding member 11*b* and the annular member 12*b* are interchangeable so that the protruding member 11*b* functions the second fastening member 12*a* and the annular member 12*b* functions the first fastening member 11*a*.

The protruding member 11*b* may include a bolt 20, and the annular member 12*b* may include a nut 30, which is fastened or unfastened to the bolt 20.

The bolt 20 may include a leg portion 21 including a male thread 21*a* around a circumference thereof and a head portion 22. The leg portion 21 may be included in the protruding portion 21' of the protruding member 11*b*.

The bolt 20 may be provided on the first fastening unit 11 so that the head portion 22 is fixed to the frame 2*a* of the drive module 2 while facing downward and the leg portion 21 is erected to protrude toward the body module 3. The head portion 21 of the bolt 20 may fixed to the drive module 2 using different methods, such as welding, attaching, or fastening through a fastening member.

The nut 30 includes a fastened hole 31 provided with a female thread 32 on an internal circumference thereof and may be disposed in a horizontal direction thereof. The fastened hole 31 may be included in the fastened hole 31' of the annular member 12*b*.

The second fastening unit 12 may include a support member 40' rotatably supporting the nut 30, and the support member 40' may include a bearing 40.

The bearing 40 may rotatably support the circumference of the nut 30. The bearing 40 includes an internal ring 41 coupled to the internal circumference of the nut 30, an external ring 42 disposed around the internal ring 41, and balls 43 located between the internal ring 41 and the external ring 42, rotatably supporting the nut 30.

Unlike the above-described configurations, the support member 40' may be provided in the first fastening unit 11 to rotatably support the bolt 20. At the instant time, the support member 40' may rotatably support the bolt 20 so that the support member 40' is fastened to or released from the nut 30.

The second fastening unit 12 may include a housing 50 including an accommodation space 51 open toward the first fastening unit 11. The accommodation space 51 is opened downward to allow the bolt 20 to enter therein, and the second fastening unit 12 may be fixed to the floor portion 3*a* of the body module 3 through the housing 50. The nut 30 and the bearing 40 may be provided in the housing 50 to be accommodated in the accommodation space 51.

When the nut 30 and the bolt 20 are fastened together, the leg portion 21 of the bolt 20 enters the housing 50 and in a state in which the nut 30 and the bolt 20 are fastened, a lower end portion of the housing 50 may be supported by the head portion 22 of the bolt 20. The housing 50 may be fixed to the body module 3 using different manners, such as welding, adhesive, fastening through a fastening member.

The bearing 40 may guide rotation of the nut 20 by a force that holds the body module 3 and the drive module 2 together or apart. For example, the bearing 40 allows the nut 30 to rotate in a direction in which the nut 30 is fastened to the bolt 20 or to rotate in a direction in which the nut 30 is unfastened from the bolt 20.

In other words, the nut 30, rotatably supported by the bearing 40, rotates in the direction in which the nut 30 is fastened to or unfastened from the bolt 20 in response to a force that holds the body module 3 and the drive module 2 together or apart, so that the fastening device 10 allows the body module 3 and the drive module 2 to be coupled or decoupled.

The force, in particular holding together, may include a force that presses at least one of the body module 3 and the drive module 2, which are in a separated state, in a direction in which the body module 3 and the drive module 2 are adjacent to each other.

The force holding together may include a force that presses the body module 3 toward the drive module 2 whose lower portion is supported on the ground or a support, in a state where the positions of the bolt 20 and nuts 30 are aligned with each other, or that lifts the drive module 2 toward the body module 3 which is fixed thereon.

Furthermore, the force holding together may include a load of the body module 3 that moves the body module 3 toward the lower portion of the drive module 2, in a state in which the positions of the bolt 20 and the nut 30 are aligned with each other.

When the force holding together is applied, the nut 30 rotatably supported by the bearing 40 rotates in a direction to be fastened to the bolt 20, fastening to the leg portion 21 of the bolt 20.

The force, in particular holding apart, may include a force that separates at least one of the body module 3 and the drive module 2, which are in a coupled state, in a direction in which the body module 3 and the drive module 2 are moved away from each other.

The force holding apart may include a force that lifts the body module 3 upwards from the drive module 2 whose lower portion is supported on the ground or a support, or that pulls the drive module 2 from the body module 3 fixed thereon and moves downward.

Furthermore, the force holding apart may include a load of the drive module 2 that moves the drive module 2 downwardly from the body module 3 fixed thereon.

When the force holding apart is applied, the nut 30 rotatably supported by the bearing 40 rotates in the direction from which the bolt 20 is released, separated from the leg portion 21 of the bolt 20.

The fastening device 10 as described above does not require a separate manipulation or component for rotating the nut 30 to fasten or unfasten the nut 30 and the bolt 20, except for the above-described force holding together or apart. As a result, it may contribute to simplifying the structure and workability according to attachment or detachment of the drive module 2 and the body module 3 of the vehicle 1.

The pitch and slope of the female thread 31 and the male thread 21*a* of the nut 30 and the bolt 20 may be determined to ensure smooth rotation of the nut 30 by the force holding together or apart.

Furthermore, the bearing 40 may be movably provided in a direction opposite to the fastening direction of the bolt 20 and the nut 30. In the above-described arrangement structure of the bolt 20 and the nut 30, the bearing 40 may be movably provided in the vertical direction. Furthermore, the second fastening unit 12 includes an elastic member 60 that elastically supports the bearing 40 during fastening process of the bolt 20 and the nut 30, so that the force acting on the fastening device 10 may be increased.

The elastic member 60 may be provided to be compressed and then restored while the nut 30 is fastened to the bolt 20. In other words, when the nut 30 is fastened to the bolt 20, the elastic member 60 presses the bearing 40 downward by the restoring force after compression, so that the nut 30 rotates in a direction in which the nut 30 is fastened to the bolt 20.

Furthermore, the elastic member 60 may be provided to be compressed and then restored while the nut 30 is fastened to the bolt 20, and to be tensioned and then restored while the nut 30 is unfastened to the bolt 20. In other words, when the nut 30 and the bolt 20 are fastened together, the elastic member 60 presses the bearing 40 downward by the restoring force after compression to rotate the nut 30 in a direction in which the nut 30 is fastened to the bolt 20, and when the nut 30 and the bolt 20 are unfastened, the elastic member 60 is pulled the bearing 40 upward by the restoring force after tension to rotate the nut 30 in a direction in which the nut 30 is unfastened to the bolt 20.

The bearing 40 is slidably accommodated in the accommodation space 51 in the housing 50 in upward and downward directions, and the elastic member 60 may include a coil spring 61 disposed at the accommodation space 51 to be compressed by the bearing 40 sliding in the upward direction thereof. The coil spring 61 may be accommodated in the accommodation space 51 to allow the bolt 20 to enter the leg portion 21.

The coil spring 61 may be provided to be elastically compressed or tensioned within a predetermined displacement range so that the coil spring 61 may be compressed and then restored, and tensioned and then restored.

The second fastening unit 12 includes a fixing member 70 to which one end portion of the coil spring 61 is coupled, so that fixing stability of the coil spring 61 inside the housing 50 may be ensured. The coil spring 61 may be coupled to the fixing member 70 through an upper portion forming one end.

The fixing member 70 is provided to form an annular shape, and may be fixed to an upper side of the accommodation space 51 so that an external circumference thereof is supported on an internal wall of the accommodation space 51.

The other end portion of the coil spring 61, one end portion of which is coupled to the fixing member 70, is coupled to the external ring 42 of the bearing 40 so that the components of the second fastening unit 12 accommodated inside the housing 50 form one body as a whole. Accordingly, the upper and lower portions of the coil spring 61 may be coupled to the fixing member 70 and the bearing 40, respectively. The opposite end portions of the coil spring 61 may be welded and fixed to the fixing member 70 and the bearing 40.

Furthermore, the fastening device 10 is provided with a locking unit 13 for locking or unlocking the fastened state of the bolt 20 and the nut 30 so that the fastened state of the bolt 20 and the nut 30 is stably maintained.

A first locking hole 52 may be formed on a side surface of the housing 50, and a second locking hole 21*b* communicating with the first locking hole 52 in a state in which the nut 30 is fastened to the bolt 20 may be provided in the leg portion 21 of the bolt 20.

The locking unit 13 may include a locking member 80. The locking member 80 is fastened to the first locking hole 52 and the second locking hole 21*b*, which communicate with each other, to lock the fastened state of the bolt 20 and the nut 30. Furthermore, the locking member 80 allows the bolt 20 and the nut 30 to be unfastened when separated from the first locking hole 52 and the second locking hole 21*b*. The locking member 80 may be provided in a form of a pin.

A third locking hole 71 communicating with the first locking hole 52 is formed in the fixing member 70. The locking member 80 is provided to be fastened or unfastened to the first locking hole 52 and the second locking hole 21*b* as well as the third locking hole 71, maintaining more securely the fastened state of the bolt 20 and the nut 30.

The locking member 80, which is fastened to or unfastened to the locking holes 52, 21*b*, and 71, may be manually operated by a worker performing fastening work between the drive module 2 and the body module 3.

FIG. 4A, FIG. 4B, FIG. 4C and FIG. 4D are views sequentially illustrating the fastening process of the first fastening unit 11 and the second fastening unit 12.

As shown in FIG. 4A and FIG. 4B, when the first fastening unit 11 and the second fastening unit 12 are fastened together, the positions of the bolt 20 and the nut 30 are first aligned with each other, and in turn the body module 3 may be settled on upper portion of the drive module 2. At the instant time, the lower portion of the drive module 2 may be supported on the ground or a support.

Thereafter, the body module 3 generates the force holding together downward due to the load thereof, so that the nut 30 supported by the bearing 40 rotates in a direction in which the nut 30 is fastened to the leg portion 21 of bolt 20.

As shown in FIG. 4C, at the instant time, the coil spring 61 presses the bearing 40 downward through the restoring force in a process of being compressed and then restored, so that the nut 30 rotates more smoothly in the direction that the nut 30 is fastened to the bolt 20. The fastening operation of the fastening device 10 may be simultaneously performed in the plurality of fastening devices 10.

When the nut 30 is fastened to the bolt 20, as shown in FIG. 4D, the locking member 80 is fastened to the locking holes 52, 21*b*, and 71 in communication with each other, so that the bolt 20 and the nut 30 may be prevented from loosening. Accordingly, the vehicle 1 may stably maintain a state in which separation between the body module 3 and the drive module 2 is prevented.

FIG. 5 is a view exemplarily illustrating a process of separating the first fastening unit 11 and the second fastening unit 12, which are coupled to each other.

As shown in FIG. 5, when the second fastening unit 12 is separated from the first fastening unit 11, the locking member 80 first is removed from the locking holes 52, 21*b*, and 71, and accordingly the body module 3 may be lifted above the drive module 2. The body module 3 may be moved upward by a lifting device not shown.

At the present time, the body module 3 moving upward may generate the force holding apart, so that the nut 30 supported by the bearing 40 rotates in the direction in which the nut 30 is unfastened to the leg portion 21 of the bolt 20.

Furthermore, at the instant time, the coil spring 61 pulls the bearing 40 upward by its restoring force in the process of being tensioned and then restored, so that the nut 30 may rotate more smoothly in the direction in which the nut 30 is unfastened to the bolt 20. The separating operation of the fastening device 10 may be simultaneously performed in the plurality of fastening devices 10.

As the nut 30 is unfastened the bolt 20, the body module 3 of the vehicle 1 may be separated from the drive module 2 positioned thereunder.

Figure 6:
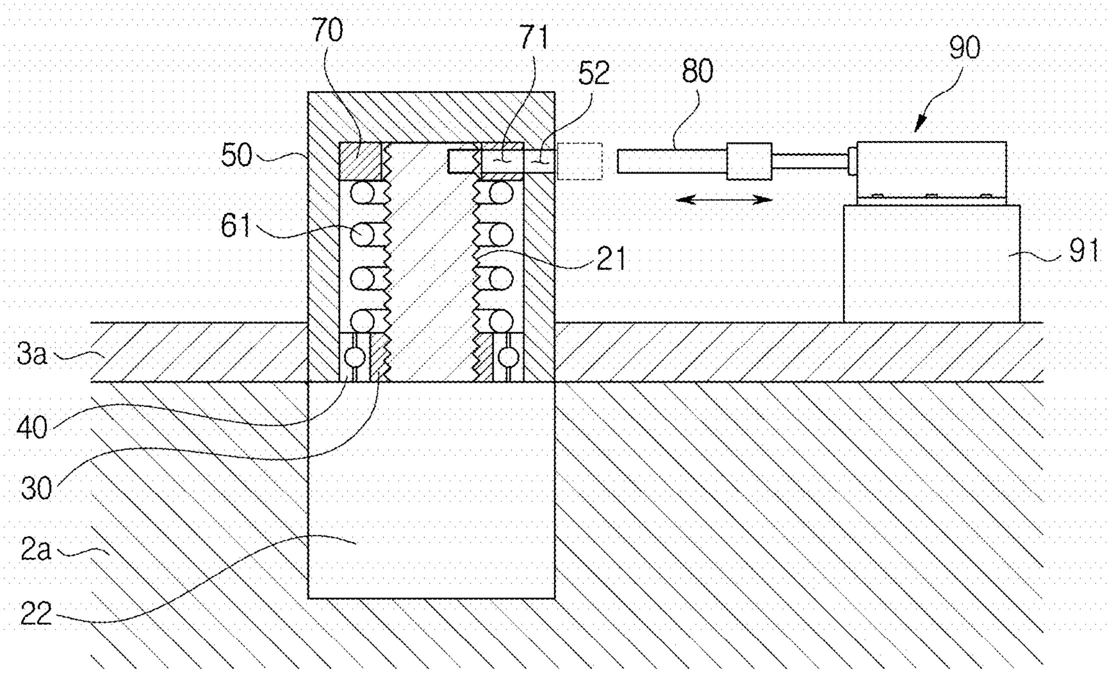
FIG. 6 is a view exemplarily illustrating one modified example of a locking unit in a fastening device for mobility according to an exemplary embodiment of the present disclosure.

As shown in FIG. 6, the locking unit 13 may be provided with a pin driver 90 that operates the locking member 80 which is fastened or unfastened to the locking holes 52, 21*b*, and 71 by use of electric power. Accordingly, the locking member 80 described above may be automatically fastened and unfastened.

The pin driver 90 utilizes electric power to drive a cylinder or a linear motor as power, and while linearly reciprocating in a state of holding one end portion of the locking member 80, fastens or unfastens the other end portion of the locking member 80 to the locking holes 52, 21*b*, and 71. The pin driver 90 may be mounted on the drive module 3 around the second fastening unit 12. Reference numeral 91 denotes a mount provided on the drive module 3 so that the pin driver 90 is mounted thereon.

In an exemplary embodiment of the present disclosure, the operation of drive module 3 is controlled by a controller including a processor.

Furthermore, the locking unit 13' may be provided to automatically lock the fastened state of the bolt 20 and the nut 30 at a time when the fastening of the bolt 20 and the nut 30 is completed, and manually unlock the fastened state of the bolt 20 and the nut 30 by the worker.

The locking unit 13' as described above may automatically lock the fastened state of the bolt 20 and the nut 30 without depending on electric power.

Figure 7:
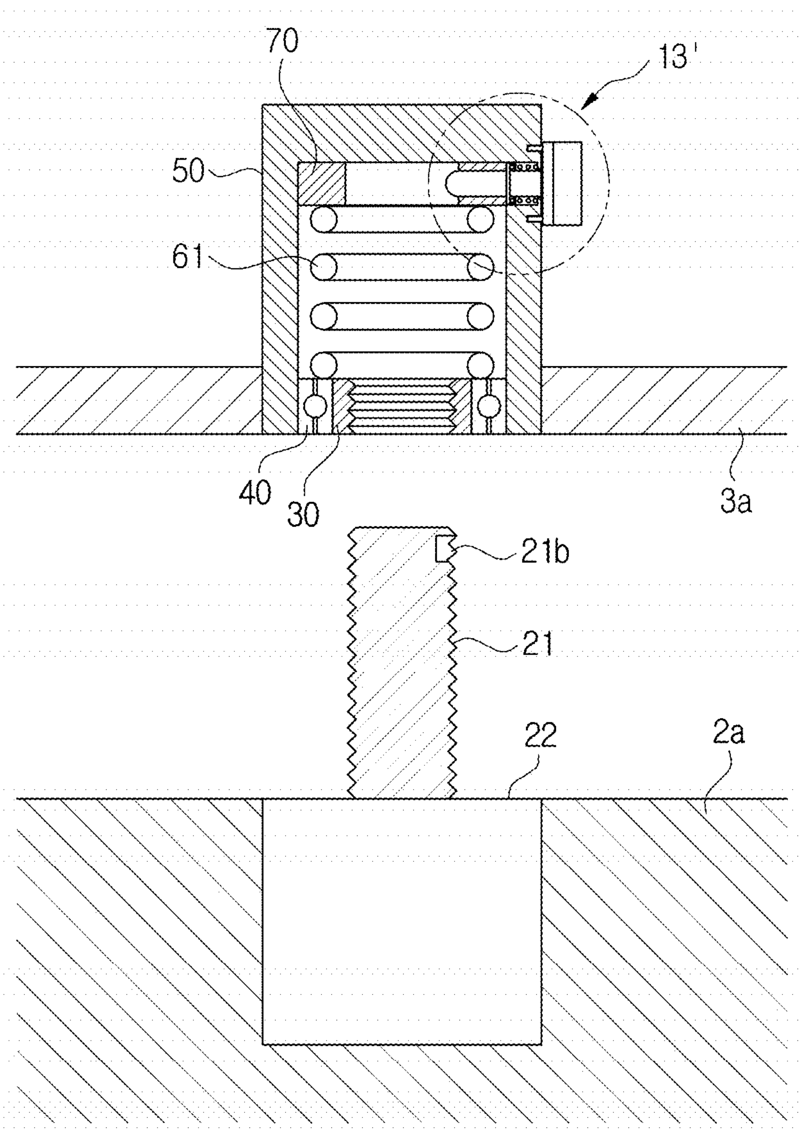
FIG. 7 is a view exemplarily illustrating another modified example of a locking unit in the fastening device for mobility according to an exemplary embodiment of the present disclosure.
Figure 8:
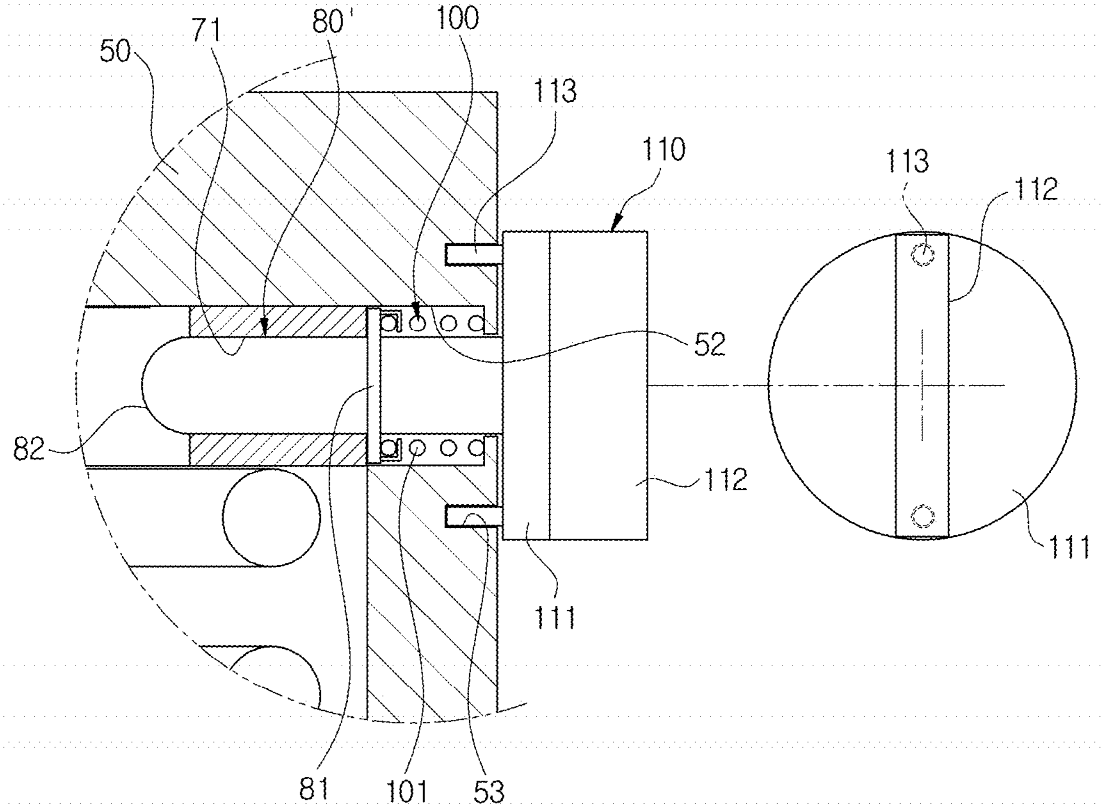
FIG. 8 is an enlarged view exemplarily illustrating the main part of FIG. 7.

As shown in FIG. 7 and FIG. 8, the locking unit 13' may include a locking member 80' slidably fastened to the first locking hole 52, an elastic member 100 for elastically pressing the locking member 80' in a direction of the second locking hole 21*b*, and an adjustor 110 for operating the locking member 80' so that the pressing force of the elastic member 100 is selectively applied to the locking member 80'.

The third locking hole 71 communicating with the first locking hole 52 is formed in the fixing member 70, and the locking member 80' is slidably fastened to the first locking hole 52 and the third locking hole 71, so that the fastened state of the bolt 20 and the nut 30 may be maintained more securely by the locking member 80'.

A catch 81 may be protruded from a circumference of the middle portion of the locking member 80' to be caught on an external surface of the fixing member 70 around the third locking hole 71 so that a protruding length of the locking member 80' protruding inside the fixing member 70 is limited.

The elastic member 100 may be provided as a coil spring 101. The coil spring 101 may be fitted around the locking member 80' inside the first locking hole 52 in a compressed state. The coil spring 101 may elastically press the locking member 80' toward the second locking hole 21*b* through one end portion thereof supported by the catch 81.

One of the aforementioned elastic members 60 and 100 may be a first elastic member and the other may be a second elastic member. Furthermore, one of the aforementioned coil springs 61 and 101 may be a first coil spring and the other may be a second coil spring.

The adjustor 110 is connected to the locking member 80' to form one body, and may be located outside the housing 50 to be operated by a worker.

The adjustor 110 may include a body 111 connected to the locking member 80', a handle 112 formed on an external surface of the body 111 to rotate the locking member 80', and protrusions 113 protruding from an internal surface of the body 111.

The external surface of the housing 50 around the first locking hole 52 may be provided with insertion grooves 53 into which the protrusions 113 are inserted.

As a worker rotates the adjustor 110 with the handle 112 so that the protrusions 113 are inserted into the insertion grooves 53, a front end portion 82 of the locking member 80' protrudes from the fixing member 70. As a result, the pressing force of the elastic member 100 may be applied to the locking member 80.

Figure 9:
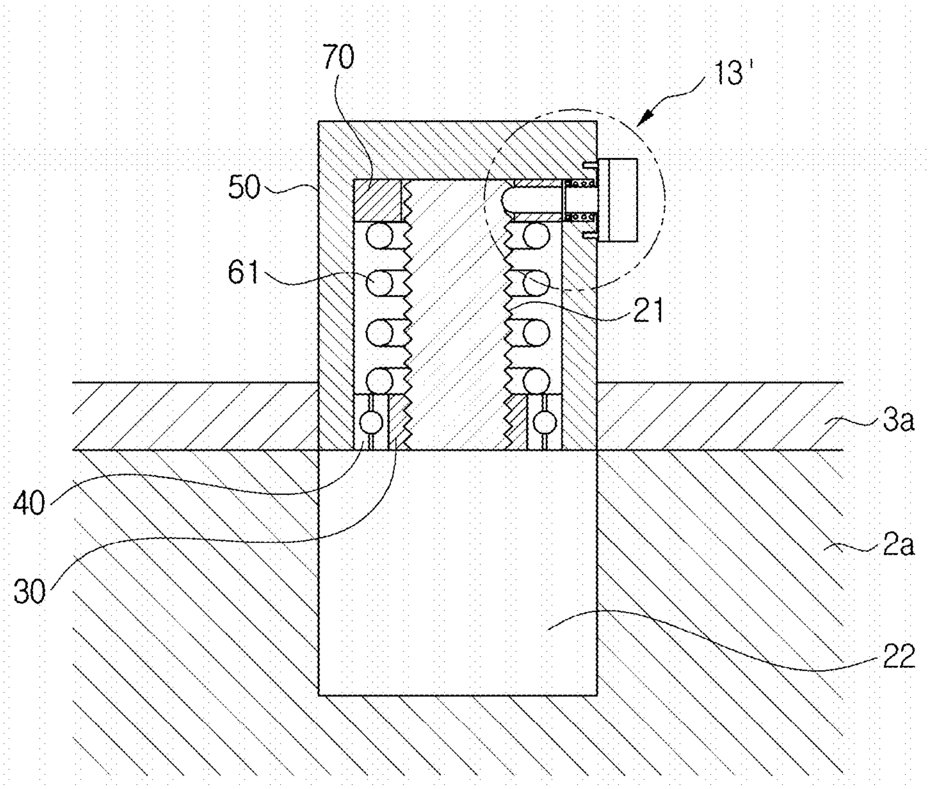
FIG. 9 is a view exemplarily illustrating a state in which fastening between the first fastening unit and the second fastening unit of a fastening device is locked through the locking unit shown in FIG. 7.
Figure 10:
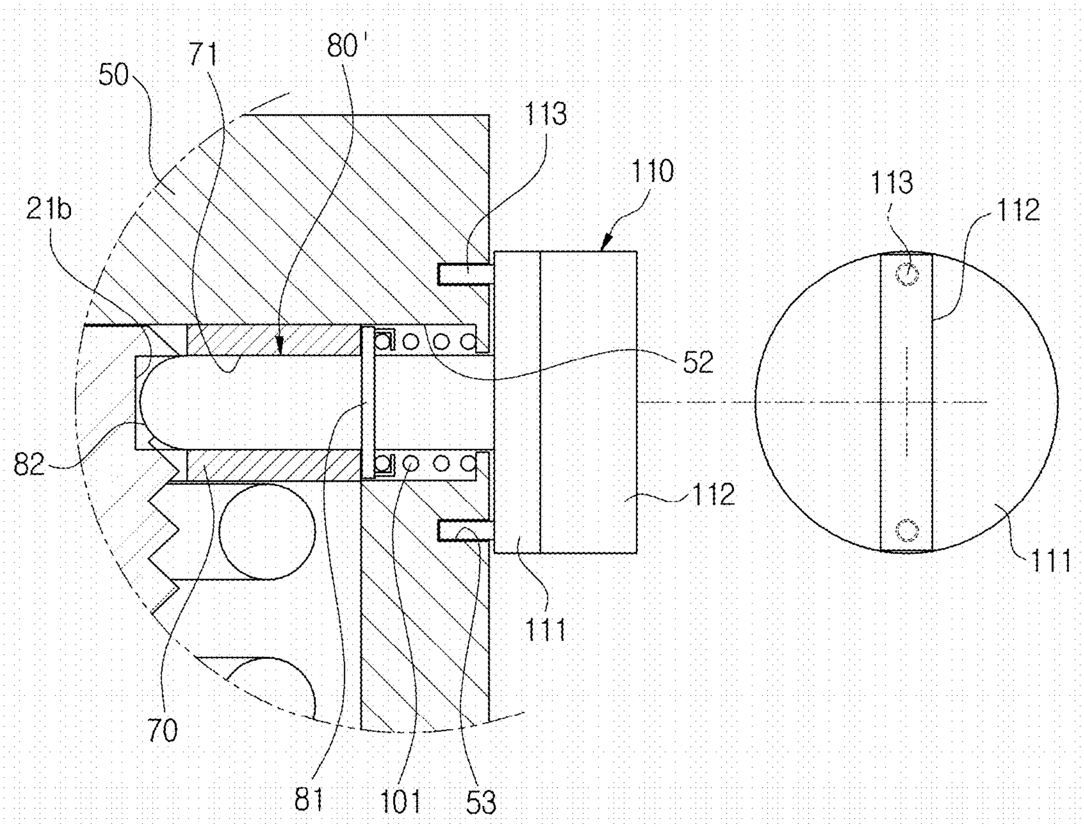
FIG. 10 is an enlarged view exemplarily illustrating the main part of FIG. 9.

In the present state, when the nut 30 is fastened to the bolt 20 and the second locking hole 21*b* communicates with the third locking hole 71 at the time when the fastening of the bolt 20 and the nut 30 is completed, the front end portion 82 of the locking member 80', which is elastically supported by the elastic member 100, is inserted to be caught in the second locking hole 21*b*. Accordingly, the fastened state of the bolt 20 and the nut 30 may be automatically locked. Such states are shown in FIG. 9 and FIG. 10.

The front end portion 82 of the locking member 80' may be provided as a curved surface convexly formed along the fastening direction of the locking member 80' so that the front end portion of the locking member 80' may be smoothly guided into the second locking hole 21*b* while being in contact with the external surface of the leg portion 21.

Figure 11:
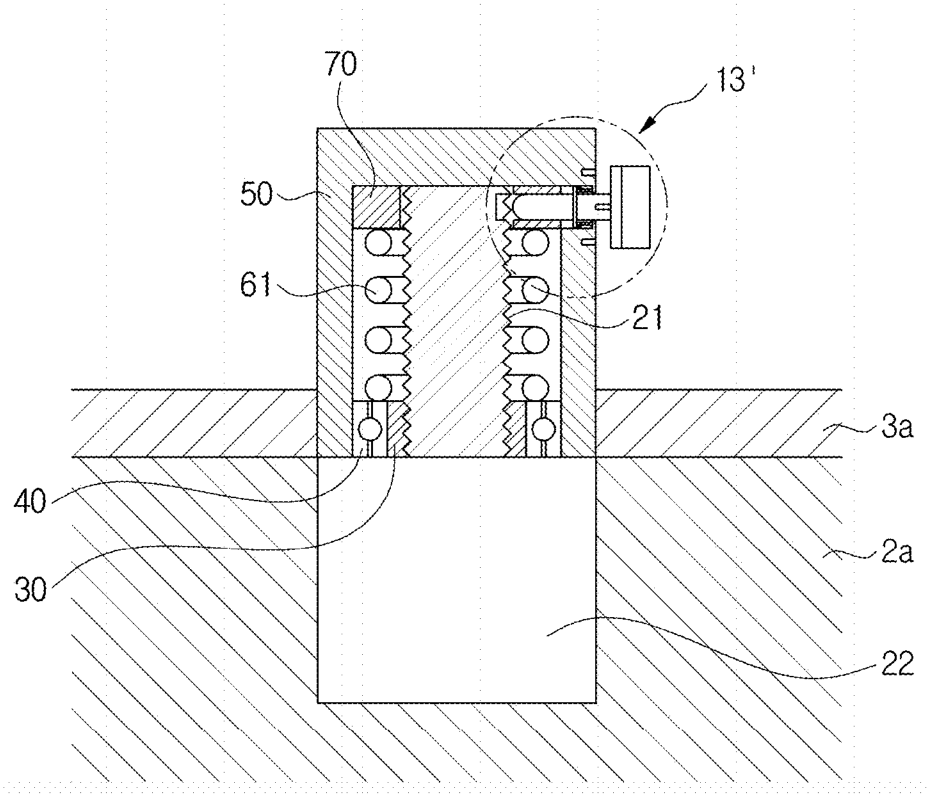
FIG. 11 is a view exemplarily illustrating a state in which locking between the first fastening unit and the second fastening unit of a fastening device is unlocked through the locking unit shown in FIG. 7.
Figure 12:
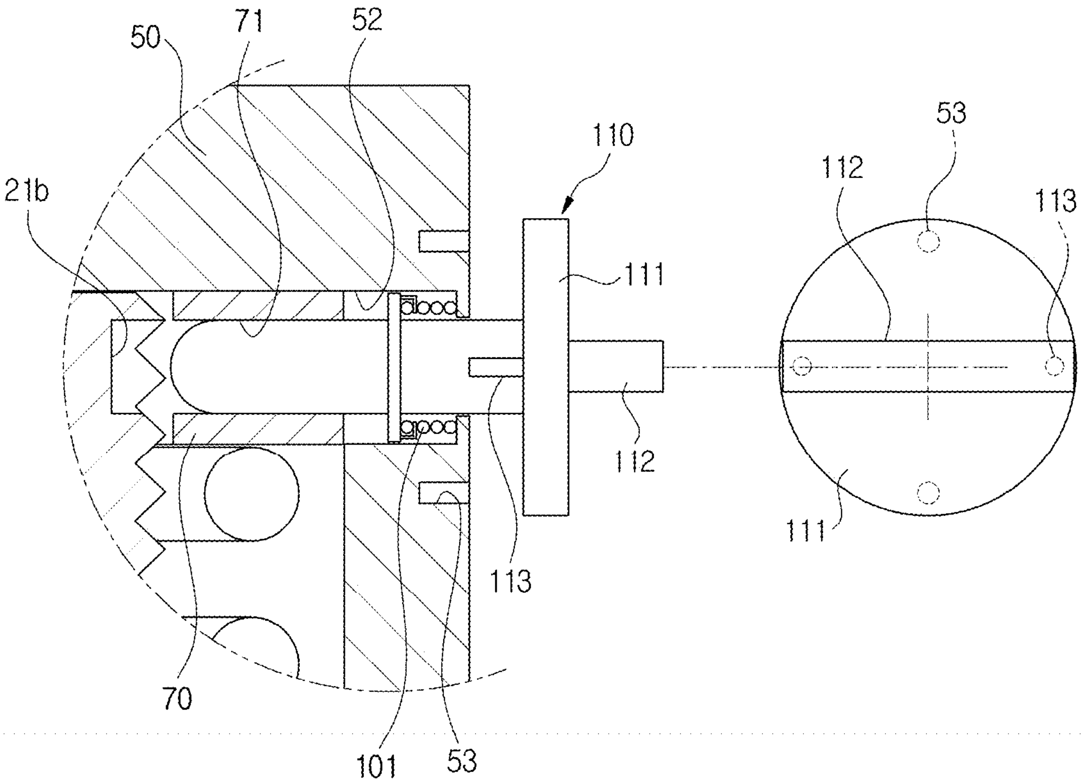
FIG. 12 is an enlarged view exemplarily illustrating of the main part of FIG. 11.

In the present state, to separate the body module 30 and the drive module 2, as shown in FIG. 11 and FIG. 12, a worker pulls and rotates the adjustor 110 so that the protrusions 113 are removed from the insertion grooves 53. As a result, the protrusions 113 are supported on the external surface of the housing 50 around the insertion grooves 53.

At the present time, the front end portion 82 of the locking member 80' exits the second locking hole 21*b* to be located inside the fixing member 70, and the coil spring 101 is further compressed and converted to a state in which no pressing force is applied to the locking member 80'.

Accordingly, a worker may separate the body module 3 from the drive module 2 by unfastening the nut 30 from the bolt 20.

In the case of the fastening device 10 to which the locking unit 13' is applied, the process of fastening the nut 30 to the bolt 20 together or the process of unfastening the nut 30 from the bolt 20 is the same as the above. Accordingly, a detailed description thereof will be omitted.

As apparently described above, various embodiments of the present disclosure may provide a fastening device for mobility configured for simplifying the structure and workability according to attachment or detachment between modules forming a mobility, and the mobility having the same.

Furthermore, various embodiments of the present disclosure may provide a fastening device for mobility configured for simplifying the structure and workability according to attachment or detachment of the drive module and the body module of the mobility, and a mobility having the same.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A fastening apparatus of a vehicle, the fastening apparatus comprising:

a first fastening unit provided in a first module of the vehicle; and a second fastening unit disposed in a second module of the vehicle, the second fastening unit coupled or decoupled to the first fastening unit for attachment or detachment between the first module and the second module;

wherein the first fastening unit and the second fastening unit include a first fastening member and a second fastening member selectively screw-coupled together, respectively, wherein the second fastening unit further includes a support member configured to support rotatably the second fastening member, wherein the support member rotatably supports, by a force holding the first module and the second module together or apart, a circumference of the second fastening member so that the second fastening unit rotates in a direction in which the second fastening member is fastened to the first fastening member or the second fastening unit rotates in a direction in which the second fastening member is released from the first fastening member, wherein the first fastening member includes a protruding member including a protruding portion, the protruding member including a bolt, wherein the second fastening member includes an annular member including a fastened hole into which the protruding portion is screw-coupled, the annular member including a nut, and wherein the support member further includes a bearing for rotatably supporting the nut.

2. The fastening apparatus of claim 1, wherein the support member is movably provided in a direction opposite to a fastening direction of the first fastening member and the second fastening member, and wherein the second fastening unit further includes an elastic member for elastically supporting the support member in a process of fastening the second fastening member to the first fastening member.

3. The fastening apparatus of claim 2, wherein the elastic member is compressed and then restored in a process of fastening the second fastening member to the first fastening member.

4. The fastening apparatus of claim 2, wherein the elastic member is compressed and then restored while the second fastening member is fastened to the first fastening member, and is tensioned and then restored while the second fastening member is released from the first fastening member.

5. The fastening apparatus of claim 1, wherein the second fastening unit further includes an elastic member and a housing including an accommodation space open toward the first fastening unit, wherein the support member is slidably accommodated in the accommodation space in a direction opposite to a fastening direction of the first fastening member and the second fastening member, and wherein the elastic member further includes a coil spring accommodated in the accommodation space to be compressed by the support member sliding in the fastening direction.

6. The fastening apparatus of claim 5, wherein the second fastening unit further includes a fixing member fixed in the accommodation space and to which a first end portion of the coil spring is coupled.

7. The fastening apparatus of claim 6, wherein a second end portion of the coil spring is coupled to the bearing.

8. The fastening apparatus of claim 1, further including a locking unit configured to lock or unlock a fastened state of the first fastening member and the second fastening member.

9. The fastening apparatus of claim 8, further including:

a housing accommodating the support member and including an accommodation space open toward the first fastening unit, wherein a first locking hole is formed in the housing, wherein a second locking hole communicating with the first locking hole is formed in the first fastening member in a state in which the second fastening member is fastened to the first fastening member, and wherein the locking unit includes a locking member coupled to or separated from the first locking hole and the second locking hole communicating with each other.

10. The fastening apparatus of claim 9, wherein the locking unit is configured to operate the locking member which is coupled to or separated from the first locking hole and the second locking hole by use of electric power.

11. The fastening apparatus of claim 8, wherein the locking unit is configured to automatically lock the fastened state at a time when fastening of the first fastening member and the second fastening member is completed.

12. The fastening apparatus of claim 11, wherein the second fastening unit further includes a housing accommodating the support member and including an accommodation space open toward the first fastening unit, wherein a first locking hole is formed in the housing, wherein a second locking hole communicating with the first locking hole is formed in the first fastening member in a state in which the second fastening member is fastened to the first fastening member, and wherein the locking unit includes:

a locking member slidably fastened to the first locking hole and including a front end portion provided to be caught in the second locking hole;

an elastic member configured to elastically press the locking member toward the first locking hole; and an adjustor positioned outside the housing and configured to operate the locking member so that pressing force of the elastic member is selectively applied to the locking member.

13. The fastening apparatus of claim 1, wherein the first module includes a lower drive module for driving the vehicle, and wherein the second module includes an upper body module providing an internal space for the vehicle.

14. A vehicle, comprising:

a first module and a second module; and a fastening device configured to attach or detach the first module and the second module;

wherein the fastening device includes:

a first fastening unit provided in the first module; and a second fastening unit provided in the second module and coupled or decoupled to the first fastening unit for the attachment or the detachment of the first module and the second module, wherein the first fastening unit and the second fastening unit include a first fastening member and a second fastening member selectively screw-coupled together, respectively, wherein the second fastening unit further includes a support member configured to support rotatably the second fastening member, wherein the support member is configured to guide a rotation of the second fastening member so that a force holding the first module and the second module together or apart allows the second fastening member to rotate in a direction to be fastened to the first fastening member or allows the second fastening member fastened to the first fastening member to rotate in a direction to be released from the first fastening member, wherein the first fastening member includes a protruding member including a protruding portion, the protruding member including a bolt, wherein the second fastening member includes an annular member including a fastened hole into which the protruding portion is screw-coupled, the annular member including a nut, and wherein the support member further includes a bearing for rotatably supporting the nut.

15. The vehicle of claim 14, wherein the force holding together includes a force that presses at least one of the first module and the second module, which are in a separated state, in a direction in which the first module and the second module are adjacent to each other, and wherein the force holding apart includes a force that separates at least one of the first module and the second module, which are in a coupled state, in a direction in which the first module and the second module are moved away from each other.

16. The vehicle of claim 14, wherein the first module and the second module are disposed in a vertical direction, wherein the force holding together includes a load of an upper one of the first module and the second module, and wherein the force holding apart includes a load of a lower one of the first module and the second module.

* * * * *